United States Patent
Wu et al.

(10) Patent No.: US 8,023,681 B2
(45) Date of Patent: Sep. 20, 2011

(54) ELECTRONIC DEVICE WITH A SPEAKER

(75) Inventors: Chin-Hung Wu, Tu-Cheng (TW); Mao-Hsiang Huang, Tu-Cheng (TW); Hao-Sian Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 699 days.

(21) Appl. No.: 12/190,674

(22) Filed: Aug. 13, 2008

(65) Prior Publication Data

US 2009/0290744 A1 Nov. 26, 2009

(30) Foreign Application Priority Data

May 21, 2008 (CN) .......................... 2008 1 0301683

(51) Int. Cl.
*H04R 1/02* (2006.01)

(52) U.S. Cl. ........ 381/386; 381/387; 381/334; 381/395; 455/575.1

(58) Field of Classification Search .................. 381/334, 381/335, 386, 387, 394, 395; 455/575.1, 455/575.8
See application file for complete search history.

(56) References Cited

U.S. PATENT DOCUMENTS

| | | | | | |
|---|---|---|---|---|---|
| 4,163,877 | A | * | 8/1979 | Schonstedt | 324/226 |
| 5,178,067 | A | * | 1/1993 | Collier | 101/405 |
| 5,201,069 | A | * | 4/1993 | Barabolak | 455/575.1 |
| 5,721,787 | A | * | 2/1998 | Neibaur et al. | 381/386 |
| 5,980,335 | A | * | 11/1999 | Barbieri et al. | 439/824 |
| 6,374,120 | B1 | * | 4/2002 | Krauss | 455/550.1 |
| 6,477,356 | B1 | * | 11/2002 | Kitamura et al. | 455/90.1 |
| 6,834,744 | B2 | * | 12/2004 | Toki | 181/148 |
| 6,925,190 | B2 | * | 8/2005 | Popken et al. | 381/395 |
| 7,069,061 | B2 | * | 6/2006 | Gammon et al. | 455/575.1 |
| 7,092,520 | B2 | * | 8/2006 | Fuhrmann et al. | 379/433.11 |
| 7,239,700 | B2 | * | 7/2007 | Fuhrmann et al. | 379/433.11 |
| 7,583,986 | B2 | * | 9/2009 | Hyun et al. | 455/575.1 |
| 7,902,474 | B2 | * | 3/2011 | Mittleman et al. | 200/516 |
| 7,933,637 | B2 | * | 4/2011 | Gammon et al. | 455/575.1 |
| 2004/0184623 | A1 | * | 9/2004 | Johannsen et al. | 381/117 |
| 2006/0258325 | A1 | * | 11/2006 | Tsutaichi et al. | 455/350 |
| 2007/0081691 | A1 | * | 4/2007 | Park et al. | 381/386 |
| 2007/0155216 | A1 | * | 7/2007 | Juan et al. | 439/352 |
| 2008/0144879 | A1 | * | 6/2008 | Yang et al. | 381/386 |
| 2009/0169046 | A1 | * | 7/2009 | Wu | 381/394 |
| 2009/0190788 | A1 | * | 7/2009 | Yang et al. | 381/386 |
| 2009/0233652 | A1 | * | 9/2009 | Yang | 455/569.1 |
| 2009/0245565 | A1 | * | 10/2009 | Mittleman et al. | 381/365 |
| 2009/0274336 | A1 | * | 11/2009 | Infanti | 381/386 |
| 2009/0279731 | A1 | * | 11/2009 | Wu | 381/386 |
| 2009/0285417 | A1 | * | 11/2009 | Shin et al. | 381/151 |

(Continued)

FOREIGN PATENT DOCUMENTS

TW 201002085 A * 1/2010

*Primary Examiner* — Mary Wilczewski
(74) *Attorney, Agent, or Firm* — Altis Law Group, Inc.

(57) ABSTRACT

An electronic device (100) having a speaker (30) located in a sealed and separate speaker enclosure is described. The electronic device includes a housing (20) having a cavity (22) receiving the speaker with at least one conductive post (342), a circuit board (70), and a cover (60) with at least one through hole (622). The cover is disposed between the housing and the circuit board. One end of the conductive post passes through the through holes and electronically connects the speaker to the circuit board.

10 Claims, 6 Drawing Sheets

U.S. PATENT DOCUMENTS

| | | | |
|---|---|---|---|
| 2009/0290744 A1* | 11/2009 | Wu et al. | 381/387 |
| 2010/0034415 A1* | 2/2010 | Tsao et al. | 381/386 |
| 2010/0061055 A1* | 3/2010 | Dabov et al. | 361/679.56 |
| 2010/0166246 A1* | 7/2010 | Zeng | 381/386 |
| 2010/0220887 A1* | 9/2010 | Welker et al. | 381/386 |
| 2010/0246881 A1* | 9/2010 | Jeong et al. | 381/387 |
| 2010/0322456 A1* | 12/2010 | Park et al. | 381/387 |
| 2010/0331058 A1* | 12/2010 | Qingshan et al. | 455/575.1 |

* cited by examiner

ELECTRONIC DEVICE WITH A SPEAKER

CROSS-REFERENCE TO RELATED APPLICATIONS

This application is related to a co-pending U.S. patent application Ser. No. 12/170,524, entitled "ELECTRONIC DEVICE WITH A SPEAKER", having the same assignee as the present application. The above-identified application is incorporated herein by reference.

BACKGROUND

1. Field of the Invention

The present invention relates to an electronic device equipped with a speaker.

2. Discussion of the Related Art

With the rapid development of technology, the design of electronic devices such as cellular phones, personal digital assistants (PDAs), and others, is driven by the marketplace to provide increased multimedia functionality. At the same time, consumer and user demands continue to require increased miniaturization of such devices.

To comply with multimedia function requirements, most electronic devices currently include a speaker, the sound quality of which strongly influences marketability.

FIG. 4 shows a typical electronic device including a housing 12, a speaker 14, a gasket 16, and a circuit board 18. The housing 12 defines a substantially rectangular recess 123 therein receiving electronic components. The recess 123 further includes a substantially oval chamber 122 receiving the speaker 14. The speaker 14 includes a diaphragm 142 and a conductive surface 144 opposite to the diaphragm 142. The diaphragm 142 is an outer surface of the speaker 14 for propagating sound. The conductive surface 144 is an internal surface electrically connecting the speaker 14 to the circuit board 18 by two elastic bodies 146.

FIGS. 5 and 6 show the typical electronic device of FIG. 4 with speaker 14 received in the chamber 122. The gasket 16 is on the top of sidewalls of the recess 123. The circuit board 18 compresses the gasket 16 for secure attachment of the circuit board to the substantially rectangular sidewalls of the recess 123. The diaphragm 142 of the speaker 14 is near the bottom of the chamber 122 in which a plurality of vent holes are defined. The elastic bodies 146 are formed by, e.g., punching and bending a sheet of metallic material. As shown in FIG. 6, one end of each elastic body 146 is fixed on the conductive surface 144, and the other resists the circuit board 18 to electrically connect the speaker 14 to the circuit board 18.

However, as electronic components are mainly arranged in a middle portion of the circuit board 18, edges of the circuit board 18 bend slightly upward because of the weight of the electronic components. In this way, spaces 124 between the chamber 122 and the edges of the circuit board 18 result in sound leakage, which interfere with sound dissipating from the vent holes of the chamber 122 and decreases the overall sound quality of the electronic device. One solution to this problem is to provide an airtight chamber for the speaker 14. However, such an airtight chamber can compromise miniaturization of the electronic device.

Further, it is difficult to precisely position the elastic bodies 146 electrically connecting the speaker 14 to the circuit board 18 as shown in FIG. 6 during assembly. Moreover, the circuit board 18 may be damaged by elastic force exerted by the elastic bodies 146.

Therefore, there is room for improvement within the art.

BRIEF DESCRIPTION OF THE DRAWINGS

Many aspects of the electronic device can be better understood with reference to the following drawings. The components in the drawings are not necessarily to scale, the emphasis instead being placed upon clearly illustrating the principles of the present electronic device. Moreover, in the drawings, like reference numerals designate corresponding parts throughout the several views.

DETAILED DESCRIPTION OF THE EMBODIMENTS

Figure 1:
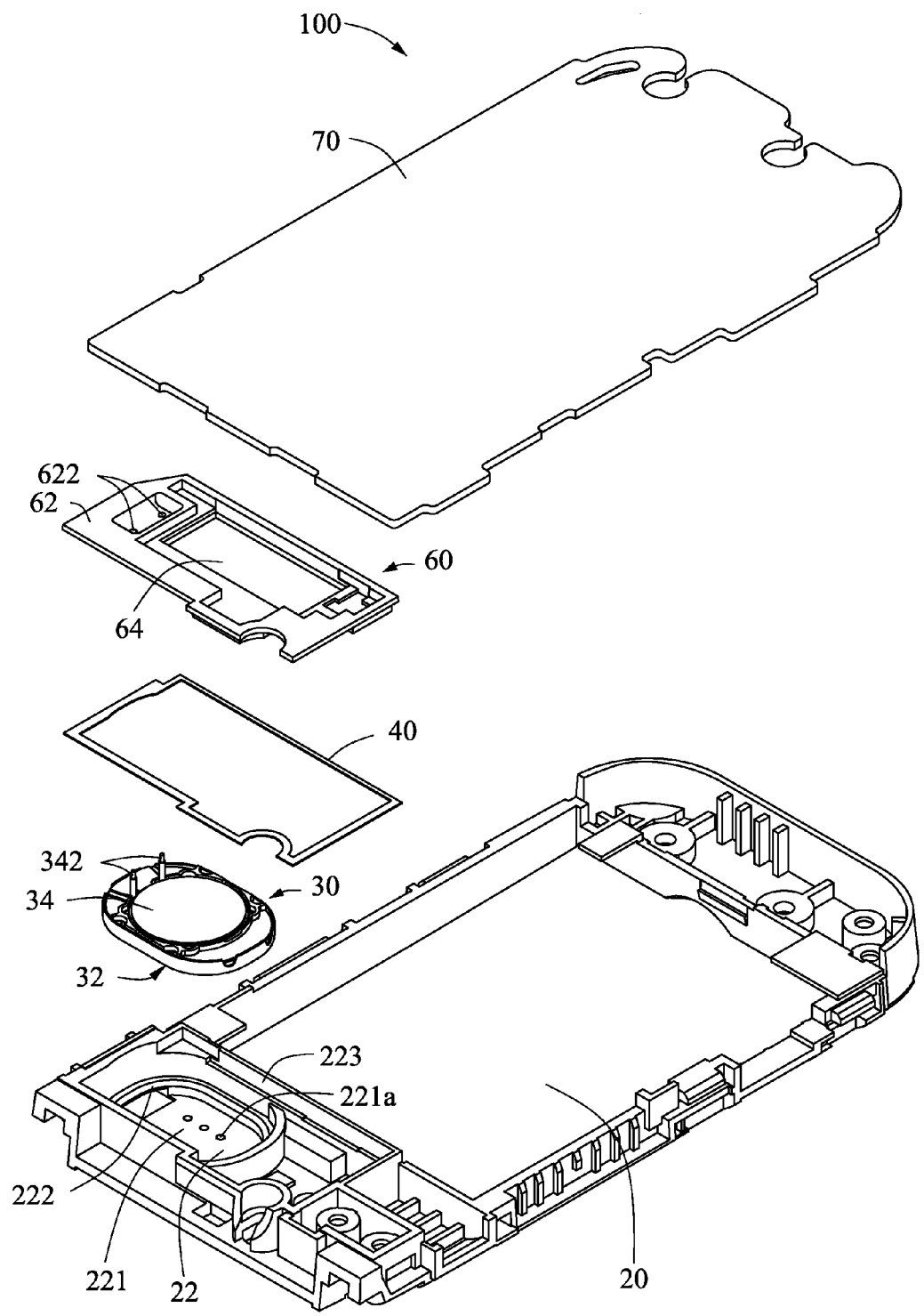
FIG. 1 is an isometric view of an electronic device according to an exemplary embodiment.

FIG. 1 shows an electronic device 100 including a housing 20, a speaker 30, an adhesive layer 40, a cover 60, and a circuit board 70.

The housing 20 defines a substantially rectangular chamber 223 in one end thereof, the chamber 223 including a substantially oval cavity 22 receiving the speaker 30. The cavity 22 includes a bottom 221 having a plurality of vent holes 221a and a substantially oval sidewall 222 disposed perpendicular to the bottom 221. In alternative embodiments, the plurality of vent holes can be defined in the sidewall 222.

The speaker 30 is an independent component receiving electric signals from the circuit board 70 for conversion to acoustic signals. In the exemplary embodiment, the profile of speaker 30 is shallower than the depth of cavity 22. The speaker 30 includes a diaphragm 32 and connecting surface 34 opposite thereto. The electric signals drive the diaphragm 32 of the speaker 30 to vibrate and generate acoustic signals/sound waves. The sound waves are propagated through the plurality of vent holes defined by the bottom 221 of the cavity 22. The diaphragm 32 is substantially the same size as the bottom 221, such that the speaker 30 can be received in the cavity 22. The connecting surface 34 further includes two conductive posts 342 perpendicular to the connecting surface 34, electrically connecting the speaker 30 to the circuit board 70.

The shape of the adhesive layer 40 corresponds to the shape of the chamber 223. The adhesive layer 40 attaches the cover 60 to the cavity 22 to fully seal the chamber 223.

The cover 60 is a substantially recessed plate, the shape of which corresponds to the shape of the chamber 223. The cover 60 includes a recess 64 surrounded by horizontal edges 62. One end of the horizontal edges 62 defines two substantially circular through holes 622. The distance between the through holes 622 substantially equals the distance between the two conductive posts 342 of the speaker 30. The through holes 662 have larger diameters than the conductive posts 342. A bottom of the recess 64 is configured for resisting the connecting surface 34 of the speaker 30.

Figure 3:
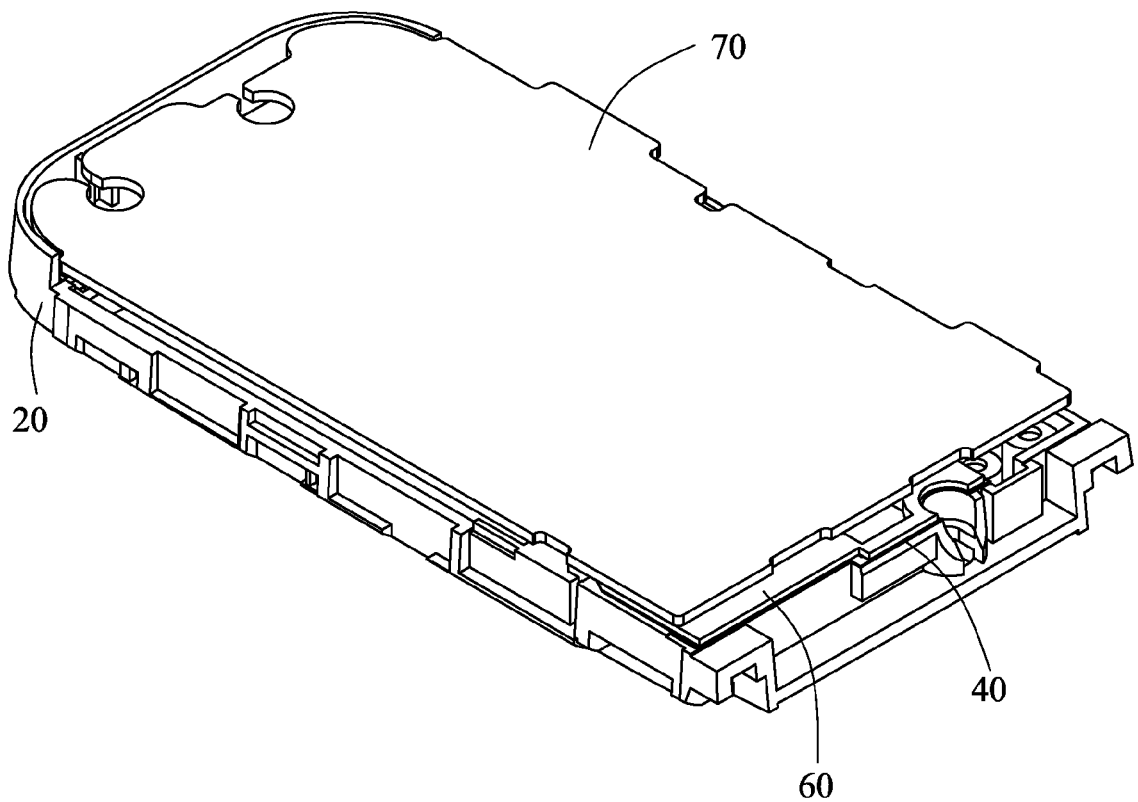
FIG. 3 is an assembled view of the electronic device in FIG. 1.
Figure 4:
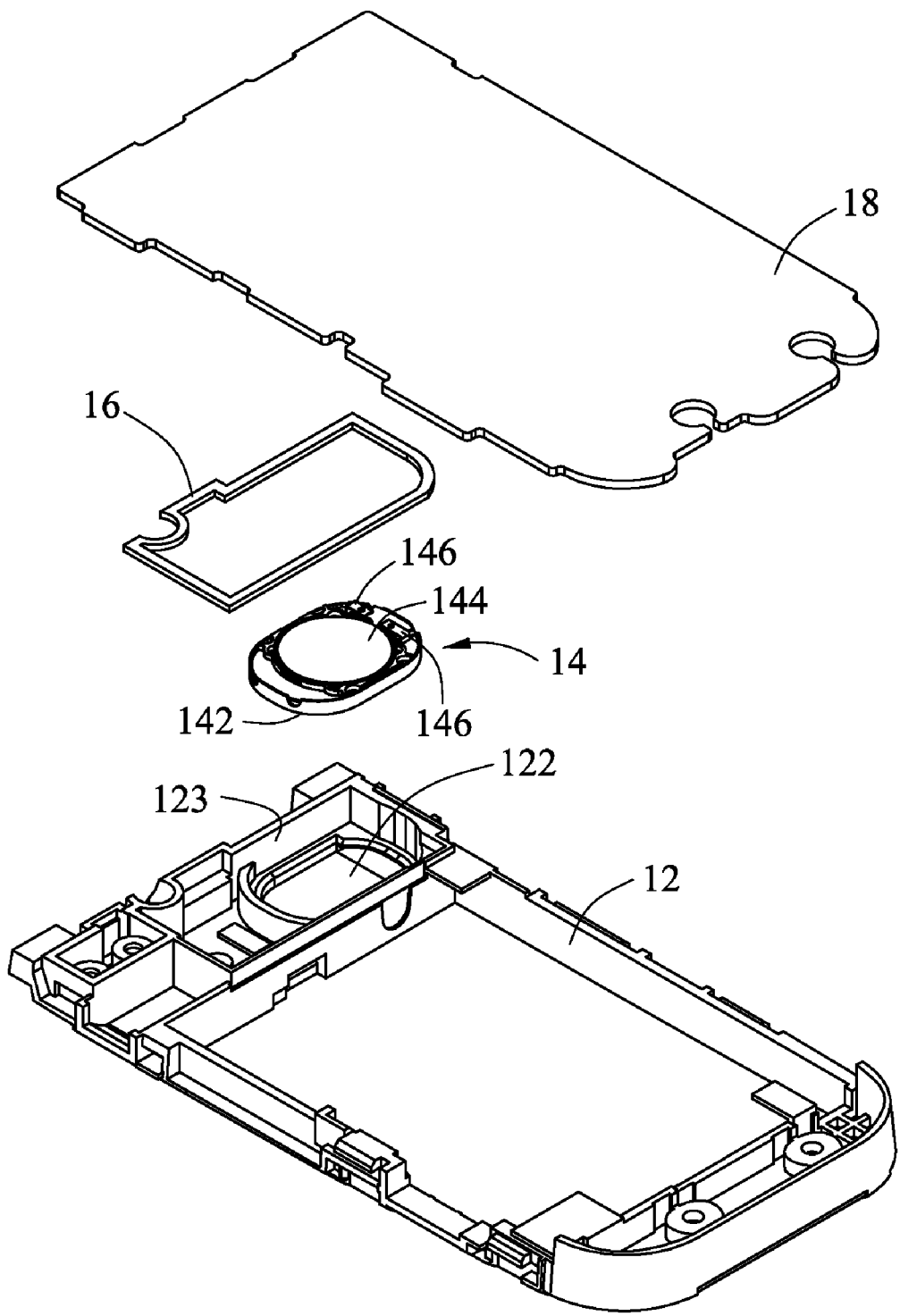
FIG. 4 is an isometric view of a typical electronic device.
Figure 5:
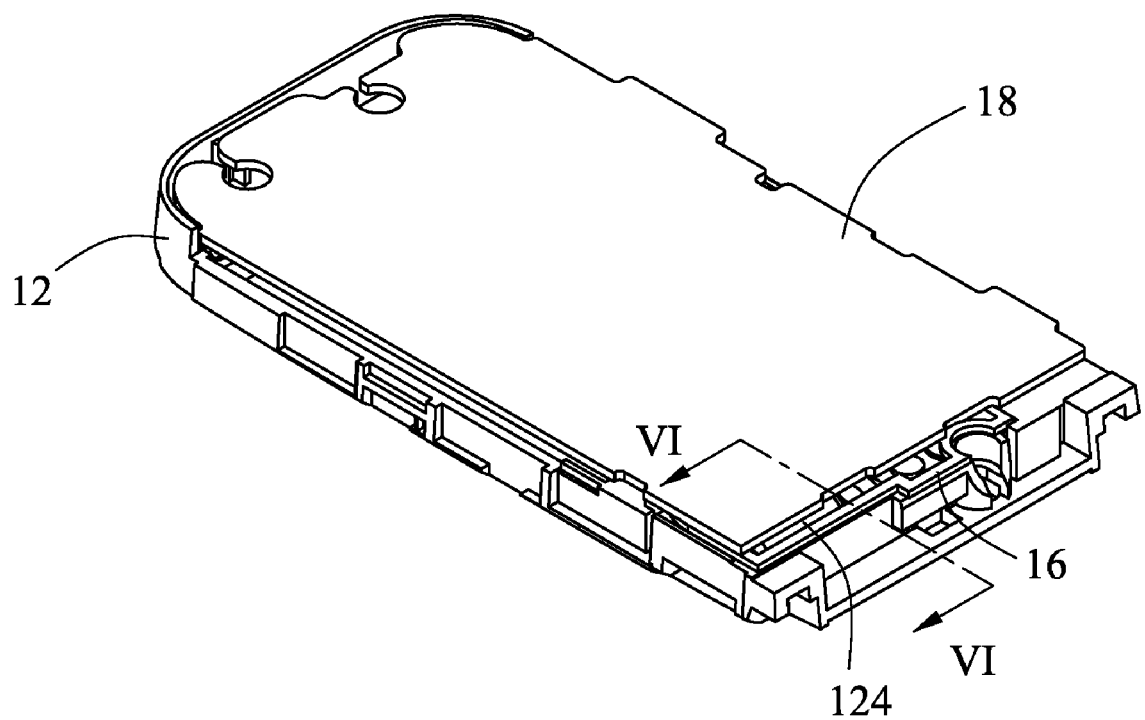
FIG. 5 is an assembled view of the typical electronic device in FIG. 4.
Figure 6:
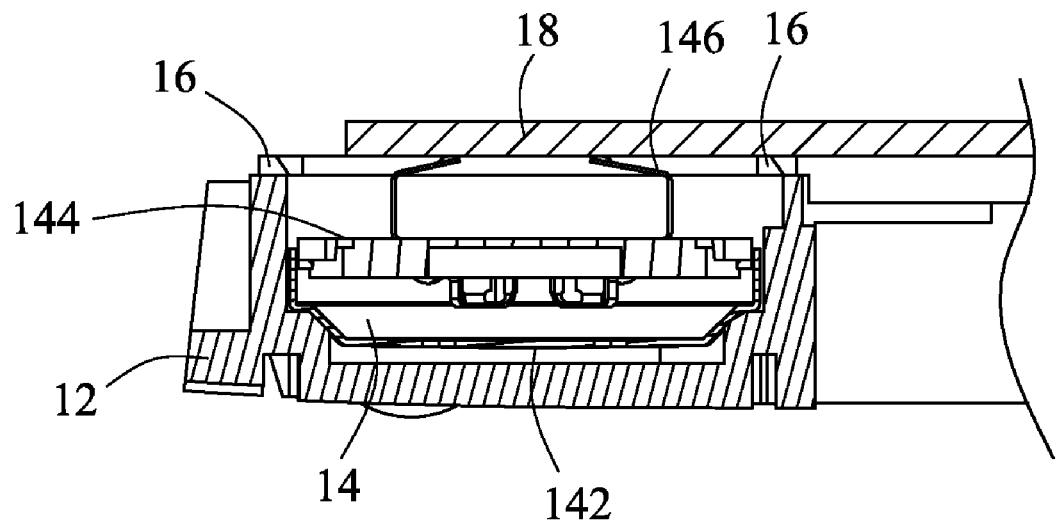
FIG. 6 is a cross-section taken along line VI-VI of FIG. 5.

The circuit board 70 is substantially rectangular with two connecting pads (not shown) defined thereon for electrical connection to the speaker 30. The circuit board 70 is the same size as the top surface of the housing 20, allowing engagement therebetween as shown in FIG. 3.

Figure 2:
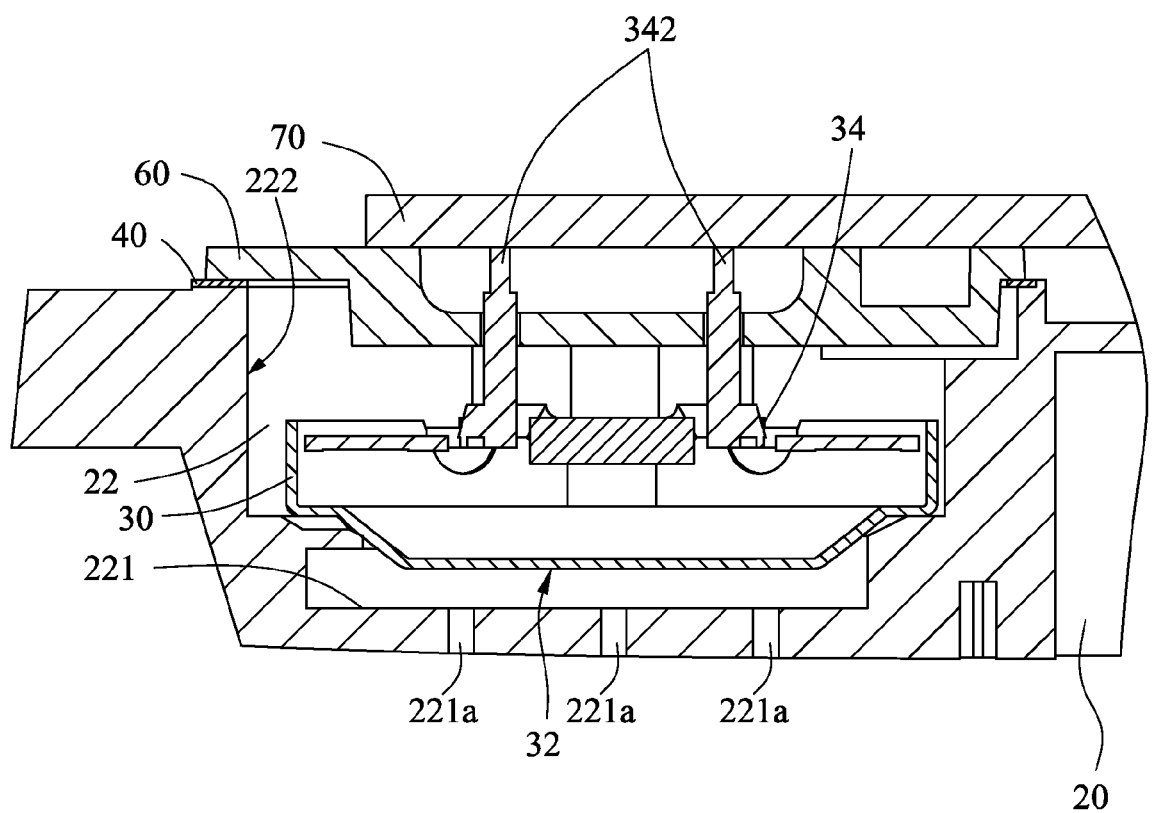
FIG. 2 is a partial cross-section of the electronic device in FIG. 1.

FIG. 2 is a cross-section of the assembled electronic device according to the exemplary embodiment. The speaker 30 has a diameter substantially equal to that of the cavity 22, allowing the outer periphery of the speaker 30 to conform closely to the sidewall 222 of the cavity 22. The diaphragm 32 of the speaker 30 faces and is spaced from the bottom 221 of the cavity 22. The conductive posts 342 of the speaker 30 pass through the through holes 622 of the cover 60 and electrically connect to the two connecting pads of the circuit board 70. In addition, the adhesive layer 40 is disposed between the chamber 223 and the cover 60 to render the cavity 22 airtight, enabling function thereof as an independent speaker enclosure.

From the foregoing it can be seen that one end of the conductive posts 342 pass through the through holes 622 of the cover 60, enabling positioning of the conductive posts 342 corresponding to the two pads of the circuit board 70. Further, the conductive posts 342 replace conventionally used elastic bodies, thereby preventing the circuit board 70 from deformation by elasticity thereof. In alternative embodiments, each conductive post 342 may be integrally formed on the connecting surface 34 of the speaker 30.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electronic device with a speaker, comprising:
   a housing comprising a cavity receiving the speaker;
   a circuit board;
   a cover defining at least one through hole, the cover being disposed between the housing and the circuit board, and sealing closed the cavity of the housing; and
   at lease one conductive post arranged on the speaker, one end of the conductive post passing through the through hole and electrically connecting the speaker to the circuit board.

2. The electronic device as claimed in claim 1, wherein the cavity comprises sidewalls and a bottom comprising a plurality of vent holes defined therethrough.

3. The electronic device as claimed in claim 1, wherein the cavity comprises a bottom and sidewalls defining a plurality of through holes.

4. The electronic device as claimed in claim 1, wherein the speaker further comprises a diaphragm and a connecting surface opposite thereto, on which the conductive posts are disposed.

5. The electronic device as claimed in claim 4, wherein the conductive posts are perpendicular to the connecting surface.

6. The electronic device as claimed in claim 2, wherein the diaphragm of the speaker faces the bottom of the cavity, and an outer periphery of the speaker corresponds to the sidewalls of the cavity.

7. The electronic device as claimed in claim 1, wherein the cover further comprises a recess and horizontal edges with the through holes defined therein, and a bottom of the recess is configured for being resisted by the speaker.

8. The electronic device as claimed in claim 1, wherein the diameter of the through holes is larger than that of the conductive posts.

9. The electronic device as claimed in claim 1, wherein the electronic device further comprises an adhesive layer attaching the cover to the cavity.

10. The electronic device as claimed in claim 1, wherein the speaker is the same size as the cavity.

\* \* \* \* \*